Aug. 17, 1926.
S. A. ARMSTRONG
FLUID STRAINER
Filed Jan. 10, 1921
1,595,983
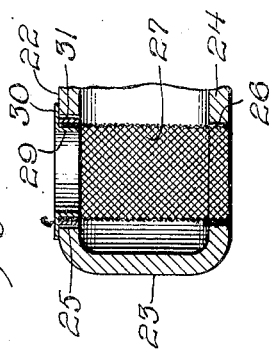
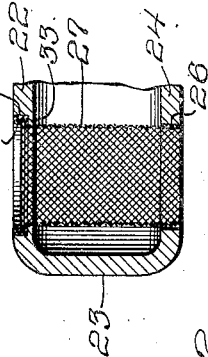
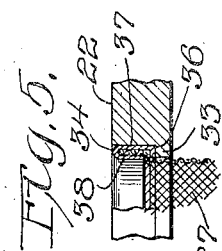
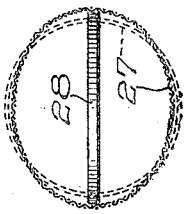
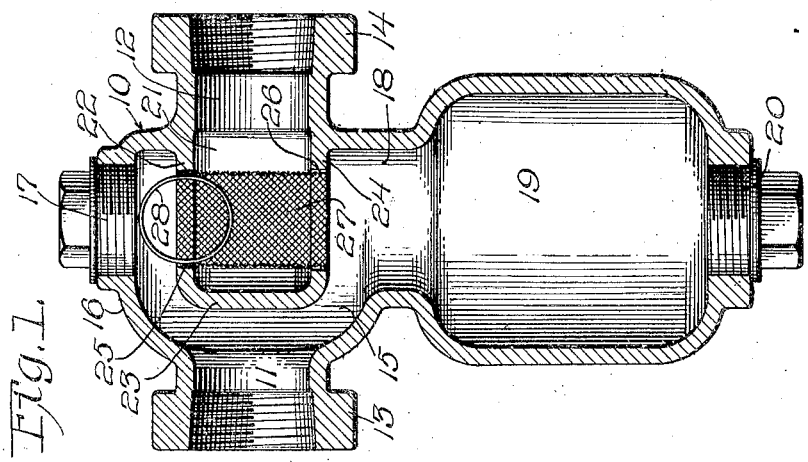
Inventor:
Samuel A. Armstrong Patented Aug. 17, 1926.

1,595,983

UNITED STATES PATENT OFFICE.

SAMUEL A. ARMSTRONG, OF SARNIA, ONTARIO, CANADA.

FLUID STRAINER.

Application filed January 10, 1921. Serial No. 436,056.

My invention has for its object to provide an improved strainer-trap fitting for incorporation in a flow-pipe line, to prevent the passage of sand or other foreign substances with the fluid and collect such foreign matters or sediment in a sediment chamber. Other objects of my invention are to simplify the construction, to make its screen-element most readily removable and replaceable and to give the fitting maximum flow-accommodating capacity.

For the attainment of these, and further objects which will become apparent to those skilled in the art, the invention consists in the features of construction, corelation and arrangement of parts hereinafter set forth, reference being made to the accompanying drawings wherein Fig. 1 is a central vertical section through a strainer-trap fitting embodying my invention; Fig. 2 is a plan view of the form of strainer and ring shown in Fig. 1, detached; Fig. 3 is a fragmentary section showing a screen of modified form; Fig. 4 is a similar section showing a further modified screen embodying my invention; and Fig. 5 is an enlarged fragment of the rim construction for the screen shown in Fig. 4.

The casting 10 that provides the shell of the fitting has near its top aligning inlet and outlet ports 11 and 12 formed in the respective connection-stubs that are internally threaded for incorporation in the flow-pipe line. Inlet 11 opens to the inlet chamber 15, the top wall 16 of which is provided with a removable screw plug 17 preferably centered on the vertical axis of the shell. The lower portion of the chamber 15 opens through throat 18 to an adequately large sediment chamber 19 in the bottom portion of which is formed a cleaning orifice normally closed by the threaded clean-out plug 20. The outlet stub 12 opens to an outlet chamber 21 the top, end, and bottom walls, respectively numbered 22, 23 and 24, whereof merge into the side walls of the shell so as completely to separate the outlet chamber from the inlet chamber save where vertically aligning axial openings 25 and 26 are made in the top and bottom wall respectively to receive the cylindrical screen 27.

The screen 27 may be a cylinder of any suitable foraminous material, copper screen cloth being preferred, and the cylinder, of a length and diameter to fit neatly in the openings 25, 26 and to extend from approximately the bottom of the bottom wall to top of the top wall of the outlet chamber, being woven in cylindrical form or cut from stripped screening and secured in cylindrical form in any suitable fashion as by soldering the meeting edges of the strip. The removable plug 17, aligning with the screen-receptive opening of the outlet chamber, is made of a diameter slightly in excess of the maximum diameter of the screen structure (including any part that the screen may carry for removal with it), so that the screen may readily be inserted and removed through the plug-receptive opening of the top wall which wall, as shown, is somewhat spaced from but relatively close to the top wall of the outlet chamber.

The screen, when inserted in place, coacts with the receptive walls of the outlet chamber so as effectively to engage the edges of holes 25 and 26 and to be self retained in such engagement. As shown in Figs. 1 and 2, a narrow spring ring 28 may be soldered or otherwise secured in the upper end of the screen cylinder, the normal outside diameter of the ring being slightly greater than the normal inside diameter of the screen, and the parts being so correlated that as the screen is pushed into the position shown in Fig. 1 the ring is compressed to the slightly elliptical form shown in Fig. 1, the screen margin correspondingly being brought from the slightly elliptical form shown in plan in Fig. 2 to the circular form shown in dotted lines in Fig. 2, by the coaction of the screen structure with the circular opening 25. Slight spring tension of the ring is adequate to hold the screen in place, its arc projecting above the screen for the convenient and accessible finger-piece by which the screen may be inserted and removed, and by making the circule of the ring just to come to the bottom of the plug 17 when the screen is in proper position, further advantage is attained in that in placing the screen it may be inserted just far enough to have the ring "bite" or hold somewhat in the upper wall of the outlet chamber and then the screwing home of plug 17 will inevitably force the screen to just the proper position.

As shown in Fig. 3 the screen may readily be retained by mere flange bearing or shoulder-contact, with any appropriate part of the outlet chamber wall, the construction shown providing a collar 29 with an outwardly bent top flange 30, the collar extending inside of the screen cylinder which may be secured thereto by an outer ring 31, leaving the margin of the flange 30 free to rest on the top wall 22 of the outlet chamber bordering the top opening 25. As shown in Figs. 4 and 5, a wall of the outlet chamber may be provided with a shoulder 33 and the screen structure may be made to cooperate with this shoulder. In this form of construction a sheet metal rim 34 is provided formed with an inbent lower flange 36, a straight outer wall 37 and a re-entrantly folded inner wall 38, the wire being laid in the confines of the outer wall and the inner wall 38 spun down to grip it as shown in Fig. 5. The flange 36 seating on the shoulder 33 adequately supports the screen.

It will be apparent that water or other fluid to be strained, entering the inlet duct 11, has free access above and below the outlet chamber walls to the screened cylindrical passage, and will flow out through the duct 12, foreign matters being caught by the screen and tending to settle into the sediment chamber directly therebelow. The screen removal and re-insertion is particularly convenient, as this work may usually be guided by the eye of the operator, the openings in which the screen is to be placed being close to the plug-opening in the top of the casing.

While I have herein described in some detail specific construction for embodiment of my invention it will be apparent that changes in detail might be made without departure from the spirit of my invention within the scope of the appended claim.

I claim:—

In a strainer of the character described, a shell providing an inlet chamber, a sediment chamber below and communicating with the inlet chamber and an outlet chamber, said outlet chamber having top and bottom walls which are spaced apart from the respective top and bottom walls of the inlet chamber and are provided with aligning openings, whereby liquid may flow from the inlet chamber to the outlet chamber through both the top and bottom walls of the outlet chamber; the top wall of the inlet chamber having an opening aligning with, and of diameter at least as great as, the openings in said top and bottom walls of the outlet chamber; a removable plug for the last said opening; a cylindrical screen, constantly open from end to end, adapted to fill and span the space between the aligning openings of the outlet chamber and insertable through said opening in the top wall of the inlet chamber, and a vertically disposed substantially circular spring ring of normal diameter slightly greater than the inside diameter of said screen, secured in the upper portion of the screen at points lying on a diameter of the ring for spring-pressing the top portion, only, of the screen against the sides of the opening in the top wall of said outlet chamber.

SAMUEL A. ARMSTRONG.